US010193223B2

(12) United States Patent
Stahlberg et al.

(10) Patent No.: US 10,193,223 B2
(45) Date of Patent: *Jan. 29, 2019

(54) MODULAR PARALLEL BEAMFORMING SYSTEM AND ASSOCIATED METHODS

(71) Applicant: General Electric Company, Schenectady, NY (US)

(72) Inventors: Markus Stahlberg, Huerth (DE); Alexander Freund, Huerth (DE); Alfred Wolsfeld, Huerth (DE)

(73) Assignee: General Electric Company, Schenectady, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/486,751

(22) Filed: Apr. 13, 2017

(65) Prior Publication Data

US 2017/0222319 A1    Aug. 3, 2017

Related U.S. Application Data

(63) Continuation of application No. 13/685,096, filed on Nov. 26, 2012, now Pat. No. 9,666,941.

(51) Int. Cl.
*H01Q 3/26* (2006.01)
*H04B 7/08* (2006.01)
(Continued)

(52) U.S. Cl.
CPC ......... *H01Q 3/2694* (2013.01); *G10K 11/346* (2013.01); *H01Q 3/26* (2013.01);
(Continued)

(58) Field of Classification Search
CPC .............................. H01Q 3/26; G10K 11/346
(Continued)

(56) References Cited

U.S. PATENT DOCUMENTS 3,821,740 A    6/1974 Ehrlich
6,167,039 A   12/2000 Karlsson et al.
(Continued)

FOREIGN PATENT DOCUMENTS

CN    102680946 A    9/2012
EP      1523112 A1    4/2005

OTHER PUBLICATIONS

Search report from PCT/US2013/067278 dated Feb. 12, 2014.
(Continued)

*Primary Examiner* — James R Hulka
(74) *Attorney, Agent, or Firm* — Mintz Levin Cohn Ferris Glovsky and Popeo, P.C.

(57) ABSTRACT

The beamforming system includes a plurality of beamformers operatively coupled to each other. Each beamformer includes a plurality of signal generation units and a plurality of respective delaying units. Each beamformer includes a plurality of multipliers assigned to each delaying unit. Each beamformer includes a plurality of summers configured to receive a respective group of conditioned signals from a respective group of the plurality of multipliers, combine the respective group of conditioned signals and generate a respective phased array output signal. Each of the summers is configured to receive at least another input other than the respective group of conditioned signals. The plurality of beamformers are interconnected such that each of the plurality of summers within each beamformer receives, as the at least another input, a respective phased array output signal from a summer of a different one of the plurality of beamformers. As associated method is also provided.

20 Claims, 7 Drawing Sheets

(51) Int. Cl.
  *G10K 11/34* (2006.01)
  *H01Q 3/38* (2006.01)
  *H04B 7/06* (2006.01)

(52) U.S. Cl.
  CPC ............ *H01Q 3/38* (2013.01); *H04B 7/0842* (2013.01); *H04B 7/0617* (2013.01)

(58) Field of Classification Search
  USPC ........................................................ 367/138
  See application file for complete search history.

(56) References Cited

U.S. PATENT DOCUMENTS

| | | | |
|---|---|---|---|
| 9,666,941 B2 * | 5/2017 | Stahlberg | H04B 7/0842 |
| 2005/0107057 A1 * | 5/2005 | Sun | H04B 7/0845 |
| | | | 455/272 |
| 2011/0060226 A1 | 3/2011 | Yen et al. | |

OTHER PUBLICATIONS

Unofficial English translation of Office Action issued in connection with corresponding CN Application No. 201380061595.5 dated Mar. 17, 2017.

* cited by examiner

MODULAR PARALLEL BEAMFORMING SYSTEM AND ASSOCIATED METHODS

RELATED APPLICATION

This application is a Continuation of U.S. patent application Ser. No. 13/685,096, filed Nov. 26, 2012. Benefit of priority is claimed from U.S. patent application Ser. No. 13/685,096 and the entire disclosure of which is incorporated herein by reference.

TECHNICAL FIELD

Embodiments of this disclosure relate generally to signal processing of sensor arrays and more specifically to a modular parallel beamforming system and associated methods.

BACKGROUND

Beamforming is a signal processing technique used to create directional or spatial selectivity of signals sent to or received from an array of sensors or an array of antennas. These arrays can be found in a variety of devices that transmit and receive electromagnetic or acoustic waves. Accordingly, this technique has numerous applications in radars, sonars, seismology, wireless communications, radio astronomy, acoustics, medical, and industrial ultrasound technologies.

In conventional beamforming, a source may transmit a wave that propagates and arrives at sensors of an array at different times, depending on the source orientation and the array geometry. To synchronize the arrival times throughout the array, outputs of the sensors of the array can be delayed and then aggregated to provide a beamforming output. In some cases, the outputs of the sensors of the array can be applied in different weights (to decrease echo, for example). The beamforming process can also be used to detect and estimate the signal-of-interest at the output of an array of sensors or antennas by means of optimal spatial filtering and interference rejection.

The array of sensors can include, for example, an array of microphones or an array of ultrasound piezoelectric crystals for receiving acoustic sound waves or an array of antennas for receiving electromagnetic waves. A beamforming technique can be used to map sound waves (e.g., in case of a sonar system), evaluate sound waves, or to augment sound waves using modifying and/or compensating delays and/or applying various weights.

Figure 1:
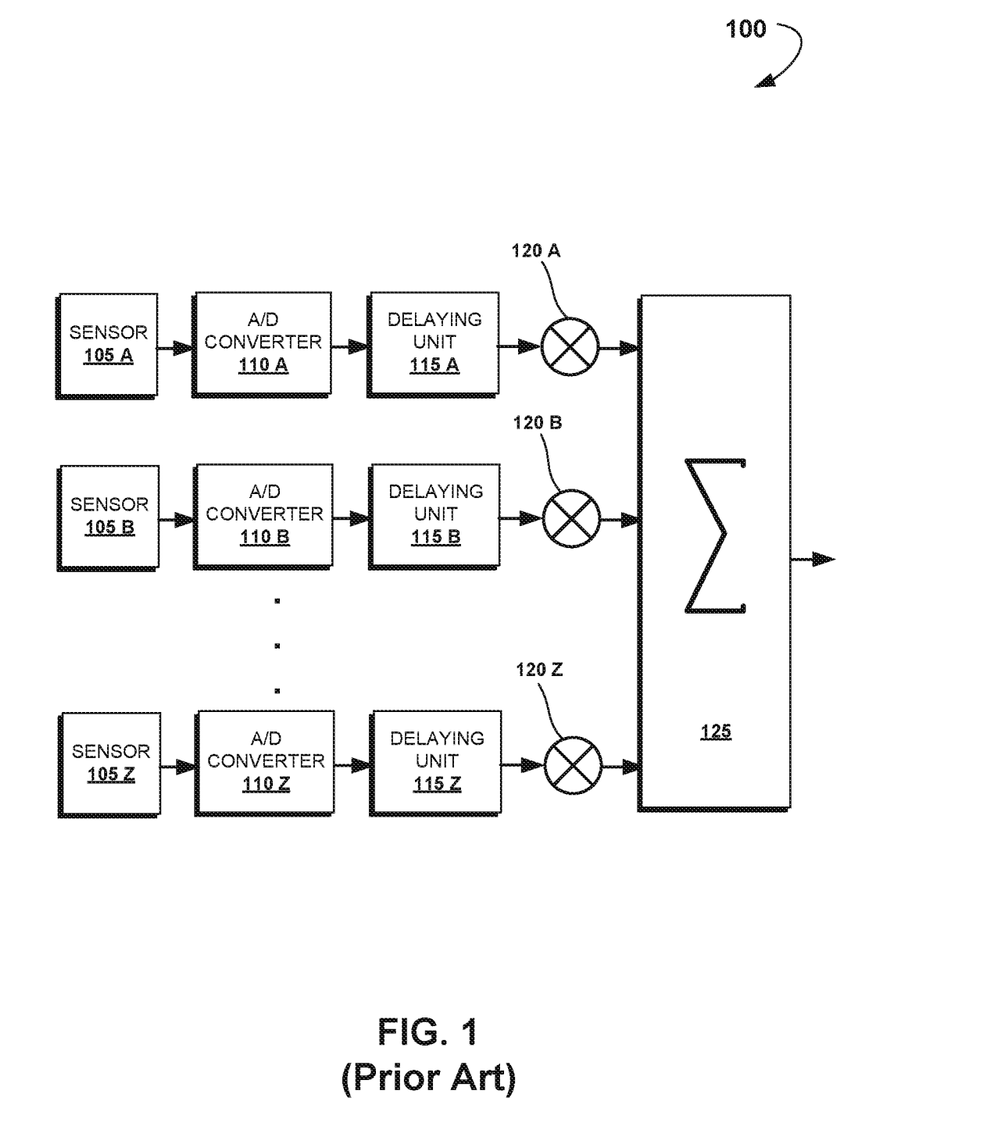
FIG. 1 shows a block diagram of an example conventional beamformer.

FIG. 1 shows a block diagram of an example conventional beamformer 100, which is also known in the prior art as a "delay-and-sum beamformer." As can be seen from FIG. 1, the beamformer 100 includes an array of sensors 105A-105Z, which may include microphones, antennas or other signal generating devices. The sensors 105A-105Z are operatively coupled to analog-to-digital (A/D) converters 110A-110Z, accordingly. The A/D converters 110A-110Z receive analog signals generated by the sensors 105A-105Z and generate corresponding digital signals for further processing. The digital signals from each A/D converter 110A-110Z are fed into a plurality of delaying units 115A-115Z. Further, the delaying units 115A-115Z delay digital signals received from the A/D converters 110A-110Z at slightly different times so that every signal may reach output at substantially the same time. In narrow-band systems, the time delay may be equivalent to "phase shifting" so that the resulting output signal, when all shifted signals are combined, is referred to as a "phased array signal."

Further, in the beamformer 100, the signals from every delaying unit 115A-115Z may be amplified by applying different "weights." Different weighting patterns (e.g., Dolph-Chebyshev) can be used to achieve the desired sensitivity patterns, improve signal-to-noise ratio, reduce blasting, or improve filtering. The weights can be applied by a plurality of multipliers 120A-120Z. Thus, both the delaying units 115A-115Z and the multipliers 120A-120Z can perform conditioning of the signals derived from the sensors 105A-105Z depending on a particular application.

With continuing reference to FIG. 1, the conditioned signals outputted from the multipliers 120A-120Z may be supplied to a summer 125. The summer 125 combines all signals into a single phased array output signal, which can be then analyzed, processed, played, or in any other way utilized by another system or apparatus. The beamformer 100 may include hardware components, software components, or a combination thereof.

In various applications, the number of input signals, i.e., signals generated by the sensors 105A-105Z, may differ. For example, in simple sonar systems, 16 sensors and, correspondingly, 16 input signals can be used; however, in more complex ultrasound testing systems, there can be hundreds of input signals. In such complex cases, beamformers may use a large number of A/D converters, delaying units, and multipliers in order to process such a big number of input signals. However, due to conventional limitations of hardware components, the number of input signals that can be combined by a conventional summer is typically less than one or several tens. To address this problem, beamformers may be equipped with more than just one summer.

Figure 2:
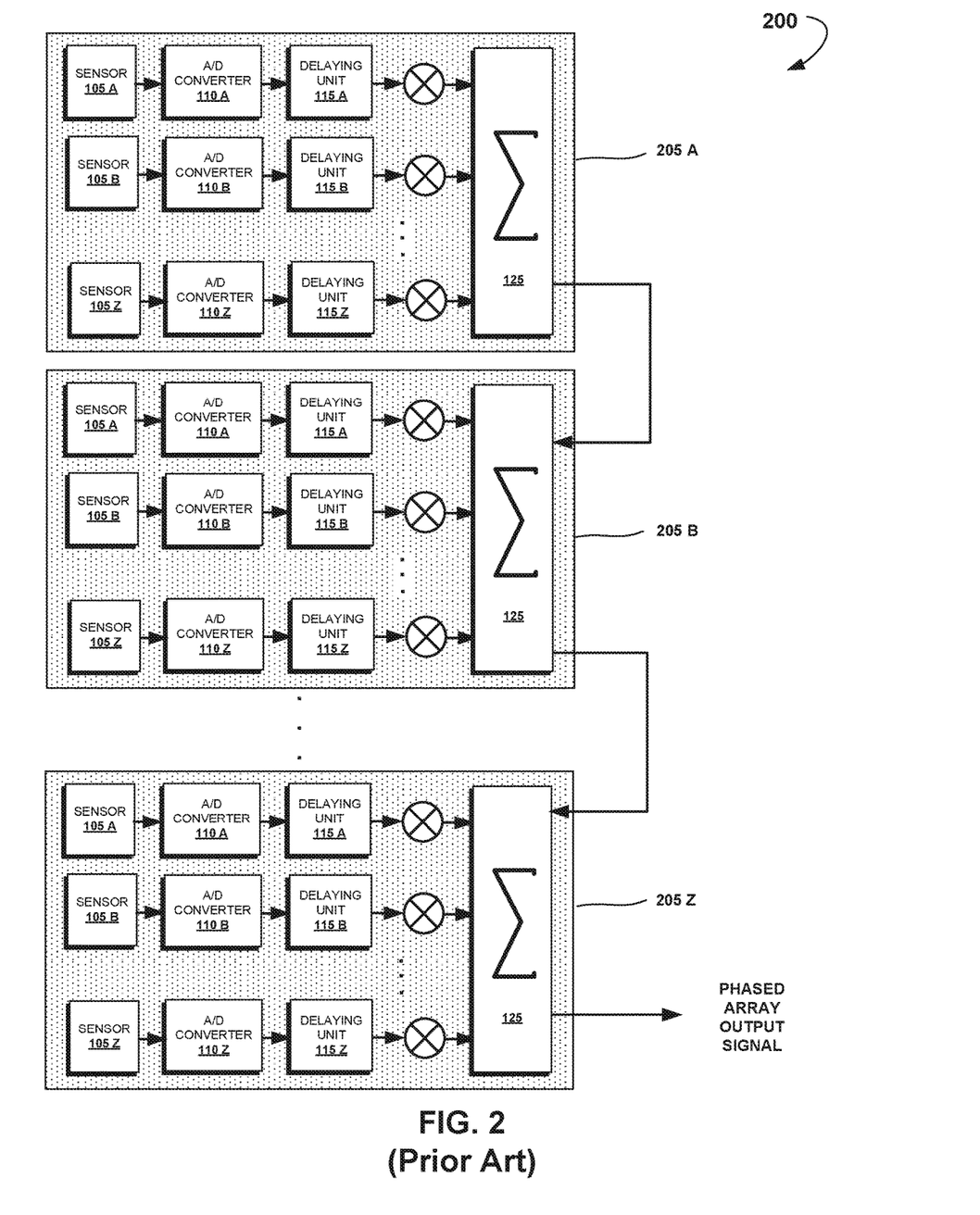
FIG. 2 shows a block diagram of an example conventional beamforming system including a plurality of beamformers.

FIG. 2 shows a block diagram of an example conventional beamforming system 200, which includes a plurality of beamformers 205A-205Z. As shown in the figure, the beamformers 205A-205Z are coupled in series such that a first output signal of a first beamformer 205A is supplied to a second beamformer 205B, in which the first output signal is combined with a second output signal, and so forth until the last beamformer 205Z generates a phased array output signal.

Figure 3:
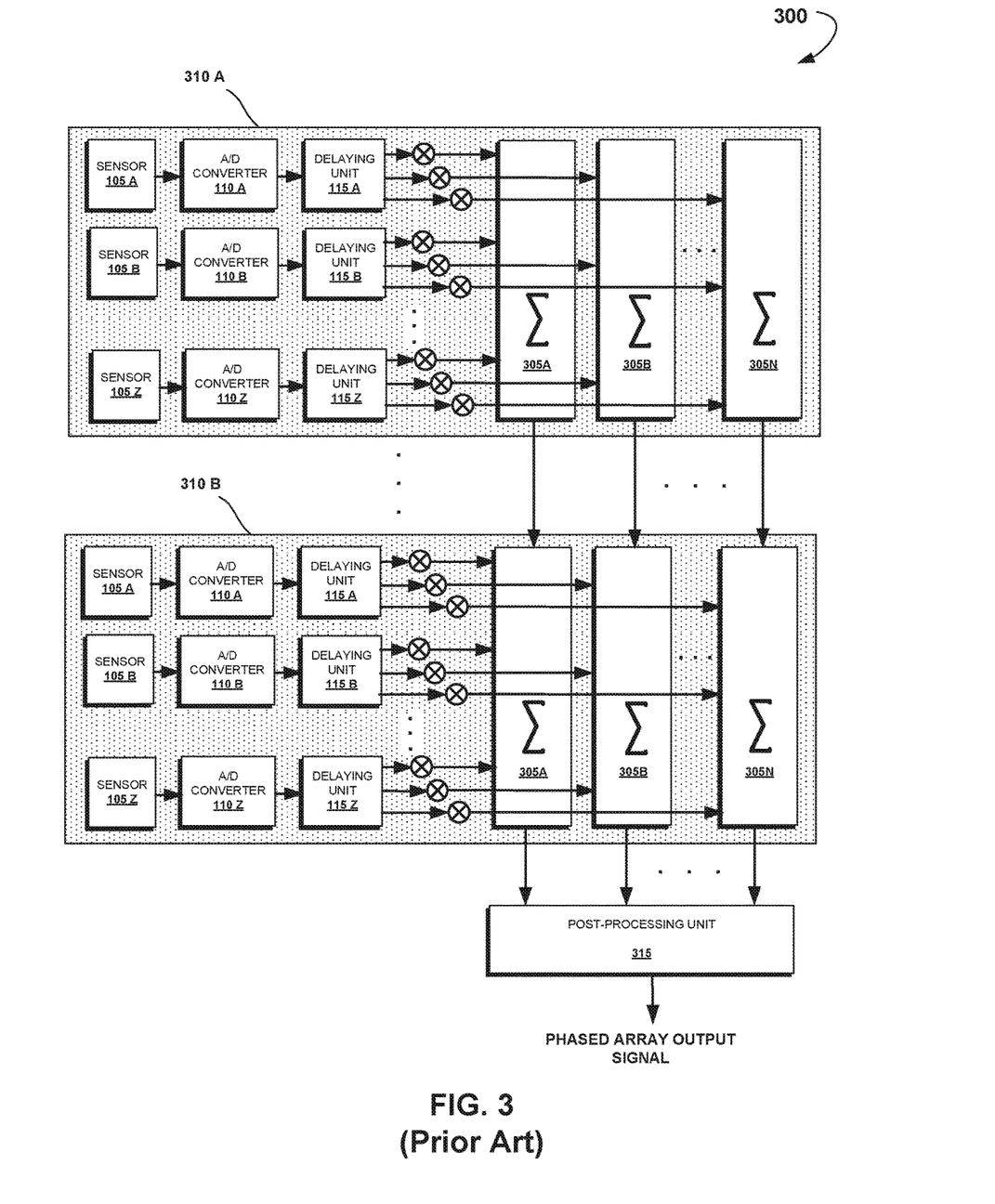
FIG. 3 shows a block diagram of another example of a conventional beamforming system including a plurality of beamformers.

FIG. 3 shows a block diagram of another example conventional beamforming system 300, which includes a plurality of beamformers. In this example of conventional system 300, each beamformer 310A, 310B, and so forth include more than one summer. As shown in FIG. 3, the delaying units 115A-115Z may generate a plurality of signals delayed by various time periods and then separately supplied to multipliers and subsequently to summers 305A-305N so that each summer 305A-305N combines signals to which the same weights were applied. The beamformers 310A, 310B, and so forth are interconnected such that the summers 305A-305N of each beamformer 310A, 310B and so forth are interconnected in series as shown in FIG. 3. Thus, the combined signals of the first summers 305A pertaining to the beamformers 310A, 310B, and so forth are summed together and outputted to a post-processing unit 315. Similarly, the summed signals of the second summers 305B and summed signals of the remaining multipliers are outputted into the same post-processing unit 315 as shown in FIG. 3. The post-processing unit 315 may process all such signals to generate a desired phased array output signal for further analysis.

Shortcomings of the conventional beamforming systems shown in FIG. 2 and FIG. 3 may include the inability to adapt to various purposes because these beamforming systems may be only configured to process a predetermined number of signals generated by the sensors 105A-10Z. Thus, the conventional beamforming systems may require significant reconfiguration for varying purposes and numbers of sensors.

BRIEF DESCRIPTION OF THE DISCLOSURE

The following presents a simplified summary of the disclosed subject matter in order to provide a basic understanding of some example aspects of the disclosed subject matter. This summary is not an extensive overview of the disclosed subject matter. Moreover, this summary is not intended to identify critical elements of the disclosed subject matter nor delineate the scope of the disclosed subject matter. The sole purpose of the summary is to present some concepts of the disclosed subject matter in simplified form as a prelude to the more detailed description that is presented later.

In accordance with one aspect, a beamforming system is provided. The beamforming system includes a plurality of modular beamformers operatively coupled to each other. Each modular beamformer includes a plurality of signal generation units, each is configured to generate a respective signal. Each modular beamformer includes a plurality of respective delaying units. Each delaying unit corresponding to a respective signal generation unit. Each delaying unit is configured to receive a respective signal from the respective signal generating unit. Each delaying unit is configured to adaptively delay the respective signal and each delaying unit is configured to output a respective delayed signal. Each modular beamformer includes a plurality of multipliers assigned to each of the delaying units. Each multiplier is configured to receive the respective delayed signal output from the respective delaying unit. Each multiplier is configured to generate a respective conditioned signal by adaptively applying a respective weight to the respective received delayed signal from the respective delaying unit and each multiplier is configured to output the respective conditioned signal. Each modular beamformer includes a plurality of summers configured to receive a respective group of conditioned signals from a respective group of the plurality of multipliers, configured to combine the respective group of conditioned signals and configured to generate a respective phased array output signal. Each of the plurality of summers is configured to receive at least another input other than the respective group of conditioned signals. The plurality of modular beamformers are interconnected such that each of the plurality of summers within each beamformer receives, as the at least another input, a respective phased array output signal from a summer of a different one of the plurality of modular beamformers.

In accordance with one aspect, a method for signal beamforming is provided. The method includes providing a plurality of modular beamformers operatively coupled to each other. The step providing a plurality of modular beamformers includes providing a plurality of signal generation units configured to generate a respective signal,. The step of providing a plurality of modular beamformers includes providing a plurality of respective delaying units corresponding to a respective signal generation unit. Each delaying unit is configured to receive a respective signal from the respective signal generating unit, configured to adaptively delay the respective signal and each delaying unit being configured to output a respective delayed signal. The step of providing a plurality of modular beamformers includes providing a plurality of multipliers assigned to each of the delaying units. Each multiplier is configured to receive the respective delayed signal output from the respective delaying unit, configured to generate a respective conditioned signal by adaptively applying a respective weight to the respective received delayed signal from the respective delaying unit and configured to output the respective conditioned signal. The step of providing a plurality of modular beamformers includes providing a plurality of summers configured to receive a respective group of conditioned signals from a respective group of the plurality of multipliers, configured to combine the respective group of conditioned signals and configured to generate a respective phased array output signal. Each of the plurality of summers being configured to receive at least another input other than the respective group of conditioned signals. The method includes interconnected the plurality of modular beamformers. The method includes receiving at each of the plurality of summers within each beamformer, as the at least another input, a respective phased array output signal from a summer of a different one of the plurality of modular beamformers.

Additional systems, methods, apparatus, features, and aspects are realized through the techniques of various embodiments of the disclosure. Other embodiments and aspects of the disclosure are described in detail herein and are considered a part of the claimed disclosure. Other embodiments and aspects can be understood with reference to the description and the drawings.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Illustrative embodiments of the disclosure now will be described more fully hereinafter with reference to the accompanying drawings, in which some but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

According to one or more embodiments of the present disclosure, a beamforming system may be provided for processing signals of an array of sensors or antennas. The beamforming system may include one or more modular beamformers, each of which may include a predetermined number of channels to process a corresponding predetermined number of sensor/antenna signals. The modular beamformers may be easily "stacked" or interconnected without the need for reconfiguration or altering of any software or hardware components.

Accordingly, engineers and researchers may configure a desired beamforming system by combining a particular number of the modular beamformers based on particular needs. As the needs change, the beamforming system may be easily re-configured by changing the number of modular beamformers used in the system.

Thus, the technical effects of one or more embodiments of the present disclosure may include flexibility in configuring or re-configuring a beamforming system by combining two or more modular beamformers depending on particular needs and tasks to be accomplished. Further technical effects may include simplifying the configuration process of beamforming systems having one or more modular beamformers. Yet further technical effects may include providing adaptive design for beamforming systems to process signals generated by various arrays of sensor or antennas.

The following provides the detailed description of various example embodiments related to modular beamformers, beamforming systems, and methods of operation thereof.

Figure 4:
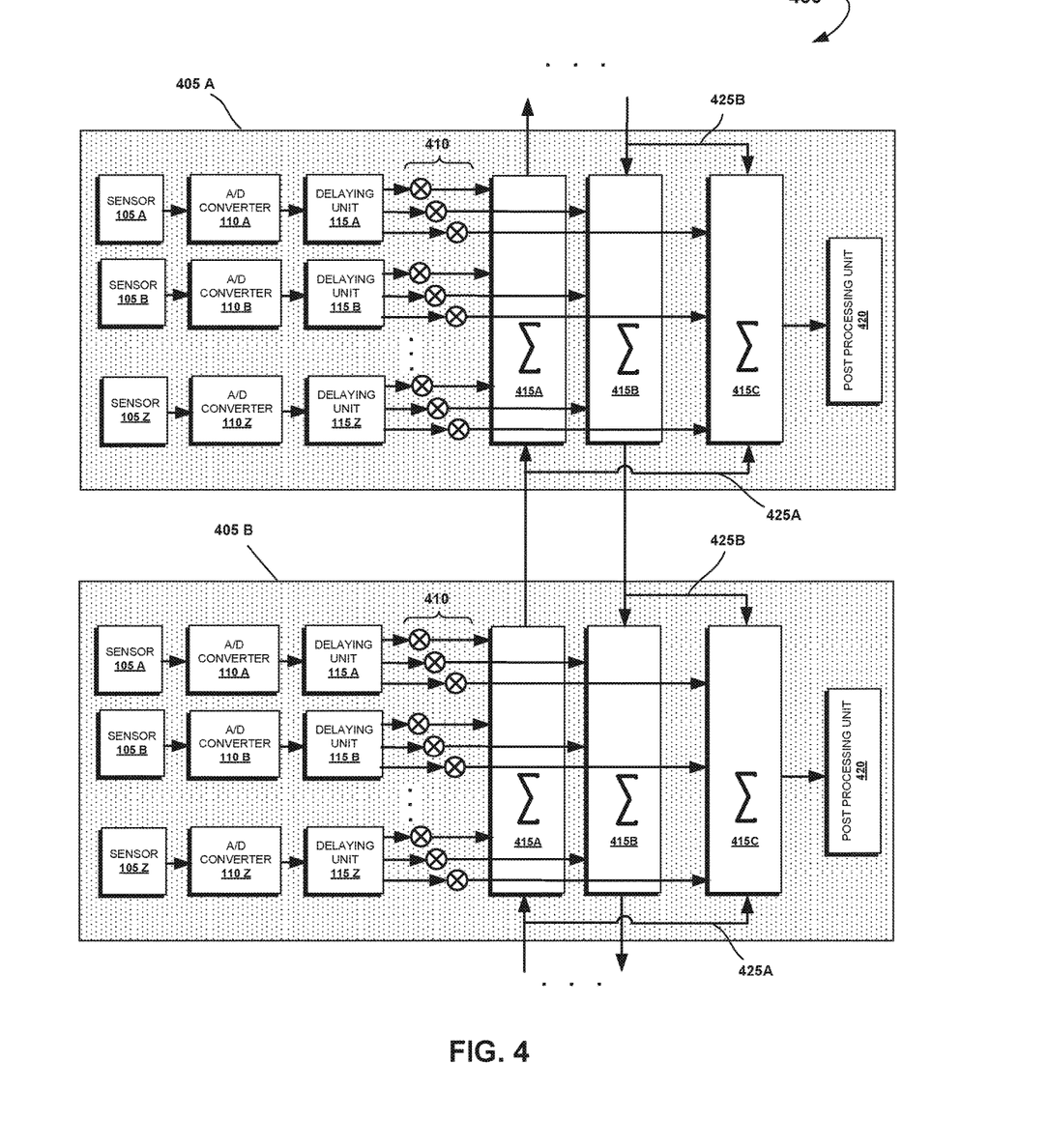
FIG. 4 shows a block diagram of a beamforming system, according to an example embodiment.

FIG. 4 shows a block diagram of a beamforming system 400, according to an example embodiment. In particular, the beamforming system 400 may include one or more modular beamforming devices. As can be seen from FIG. 4, the beamforming system 400 includes at least two modular beamforming devices 405A and 405B. Each modular beamforming device 405A, 405B may include a plurality of signal generating units, which may consist of a plurality of sensors 105A-105Z and/or a plurality of A/D converters 110A-110Z operatively coupled thereto. The sensors 105A-105Z may include microphones, antennas, ultrasound receivers, or similar analog or digital electronic devices. The A/D converters 110A-110Z may be utilized when the sensors 105A-105Z output analog signals. Thus, the A/D converters 110A-110Z may convert the analog signals into corresponding digital signals, when necessary.

Each modular beamforming device 405A, 405B may further include a plurality of delaying units 115A-115Z, which may be configured to delay digital signals received from the A/D converters 110A-110Z at different times. The signals may be delayed by predetermined time periods, adaptively, or dynamically. In the latter case, there can be utilized a "dynamic focusing" technique to generate a plurality of "phase shifted" signals delayed by different time periods. In the shown example embodiment, the delaying units 115A-115Z output three signals delayed by different time periods. It should be understood, however, that a different number of output signals can be generated, each of which may be delayed by any suitable time period.

Furthermore, as shown in FIG. 4, the signals delayed by the delaying units 115A-115Z may be conditioned by multipliers 410. Specifically, the multipliers 410 may modify the signal output by the delaying units 115A-115Z by applying different "weights." This modification may be used to improve signal sensitivity, improve signal-to-noise ratio, or perform specific filtering. The weights may be either pre-determined, determined dynamically, or adaptively selected and applied. In the latter case, the "dynamic apodization" technique can be used. In the shown embodiment, there can be three multipliers 410 associated with every delaying unit 115A-115Z, although any other number of multipliers 410 can be used.

Still referencing to FIG. 4, the signals output by the multipliers 410 are submitted to corresponding summers 415A-415C. Accordingly, there can be three summers 415A-415C, each of which receives signals delayed by delaying units 115A-115Z. One of the summers, e.g. the summer 415C, may be operatively coupled with a post-processing unit 420 which may perform additional signal processing as described in more detail below.

At least two modular beamformers 405A and 405B may be interconnected together with the help of one or more connection units such as a connection unit 425A and a connection unit 425B. In general, the connection units 425A, 425B may be configured to transmit signals from summers of one modular beamformer to summers of another modular beamformer. As shown in FIG. 4, the connection unit 425A can operatively couple the summers 415A in series, such that the signals from one summer 415A of one modular beamformer is transmitted to another summer 415A of another modular beamformer in a first direction. In addition, as shown in FIG. 4, the connection unit 425A can operatively couple the summer 415A with the summer 415C. Similarly, the connection unit 425B can operatively couple the summers 415B in series, such that the signals from one summer 415B of one modular beamformer can be transmitted to another summer 415B of another modular beamformer in a second direction, which is opposite to the first direction. In addition, the connection unit 425B can operatively couple the summer 415B with the summer 415C in each modular beamformer.

Therefore, as one skilled in the art may recognize, the summer 415C of each modular beamformer of the system 400 may combine phased signals received from each modular beamformer of the system 400. In other words, the resulting phased array output signal may be generated by any of the modular beamformers 405A, 405B, and so forth within the beamforming system 400. This technique can provide greater flexibility in configuring beamforming systems because such systems may be constituted by any number of modular beamformers having any number of sensors (or channels). Each modular beamformer, in turn, may serve as a "summing unit" for all modular beamformers used in the system, thereby providing additional flexibility for design and the use of such systems.

The post-processing unit 420 may be configured to assist in combining signals from the modular beamformers and/or perform any additional signal post-processing. For example, the post-processing unit 420 may generate an evaluation signal based on the resulting phased array output signal generated by one of the summers 415C. Furthermore, the post-processing unit 420 may use additional filtering, weighting, or other signal modifying techniques.

Figure 5:
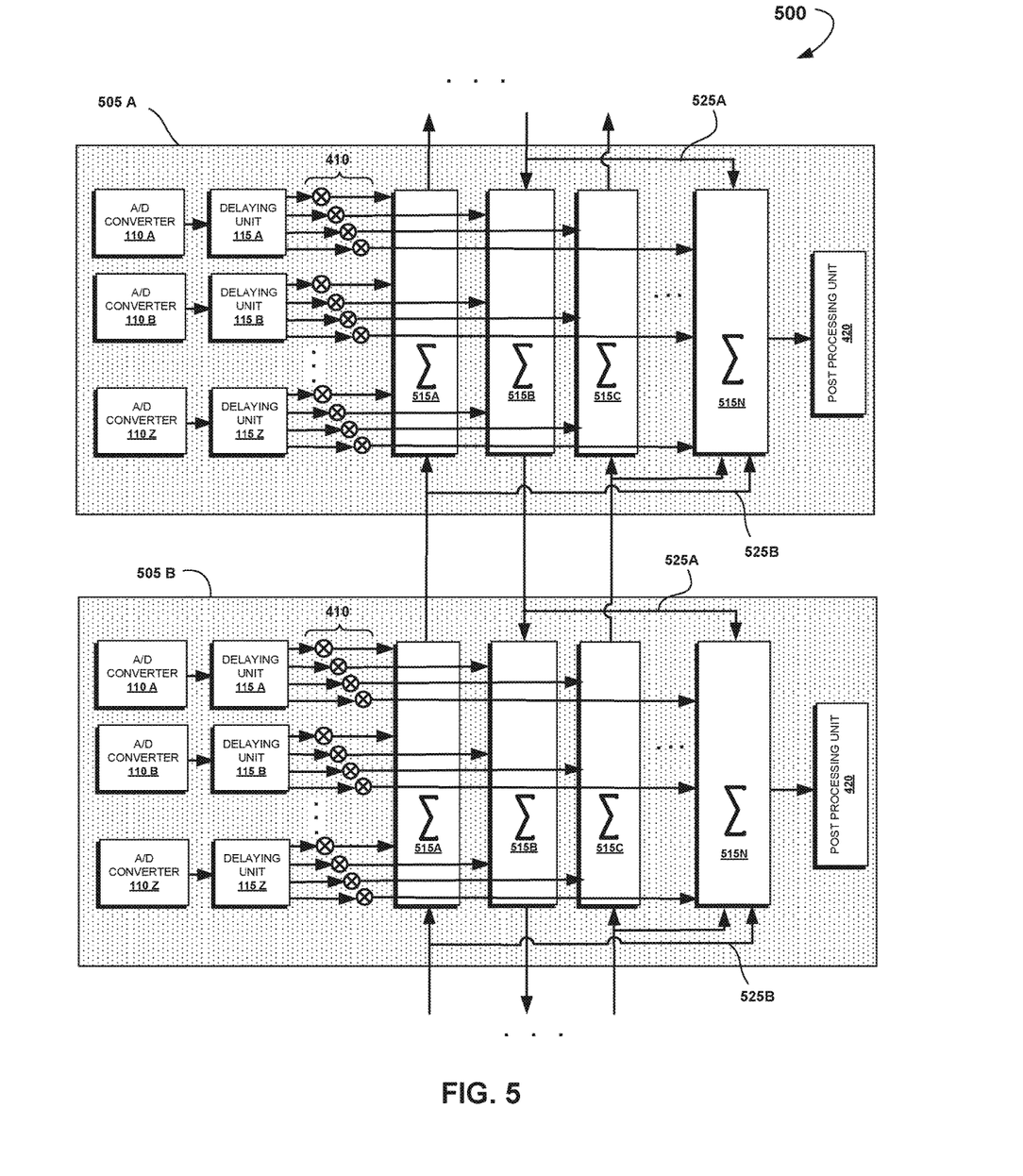
FIG. 5 shows another a block diagram of a beamforming system, according to an example embodiment.

FIG. 5 shows a block diagram of a beamforming system 500, according to another example embodiment. In this embodiment, the beamforming system 500 is a scaled model of the beamforming system 400. As shown in the figure, the beamforming system 500 may include two or more of modular beamformers 505A, 505B, and so forth, which are interconnected in parallel. As described above, each modular beamformer 505A, 505B, and so forth may include a plurality of sensors 105A-105Z (not shown), a plurality of A/D converters 110A-110Z, a plurality of delaying units 115A-115Z, a plurality of multipliers 410, a plurality of summers 515A-515N, and a post-processing unit 420. In this embodiment, there may be more than three summers and more than three multipliers. More specifically, the delaying units 115A-115Z may generate N signals from each A/D converter 110A-110Z by applying a different delay. These N signals may be adaptively amplified by N multipliers 410, and then supplied to N summers 515A-515N. Furthermore, as will be recognized by those skilled in the art, there can be more than one post-processing unit 420, which may be in communication with corresponding summers 515A-515N.

One of the summers, specifically the summer 515N, may serve as a "central" summer which may combine signals from each modular beamformer 505A, 505B, and so forth to generate a phased array output signal. The connection units 525A and 525B may interconnect the summers 515A-515N of various modular beamformers as shown in the FIG. 5, similarly to those described above with reference to FIG. 4.

Figure 6:
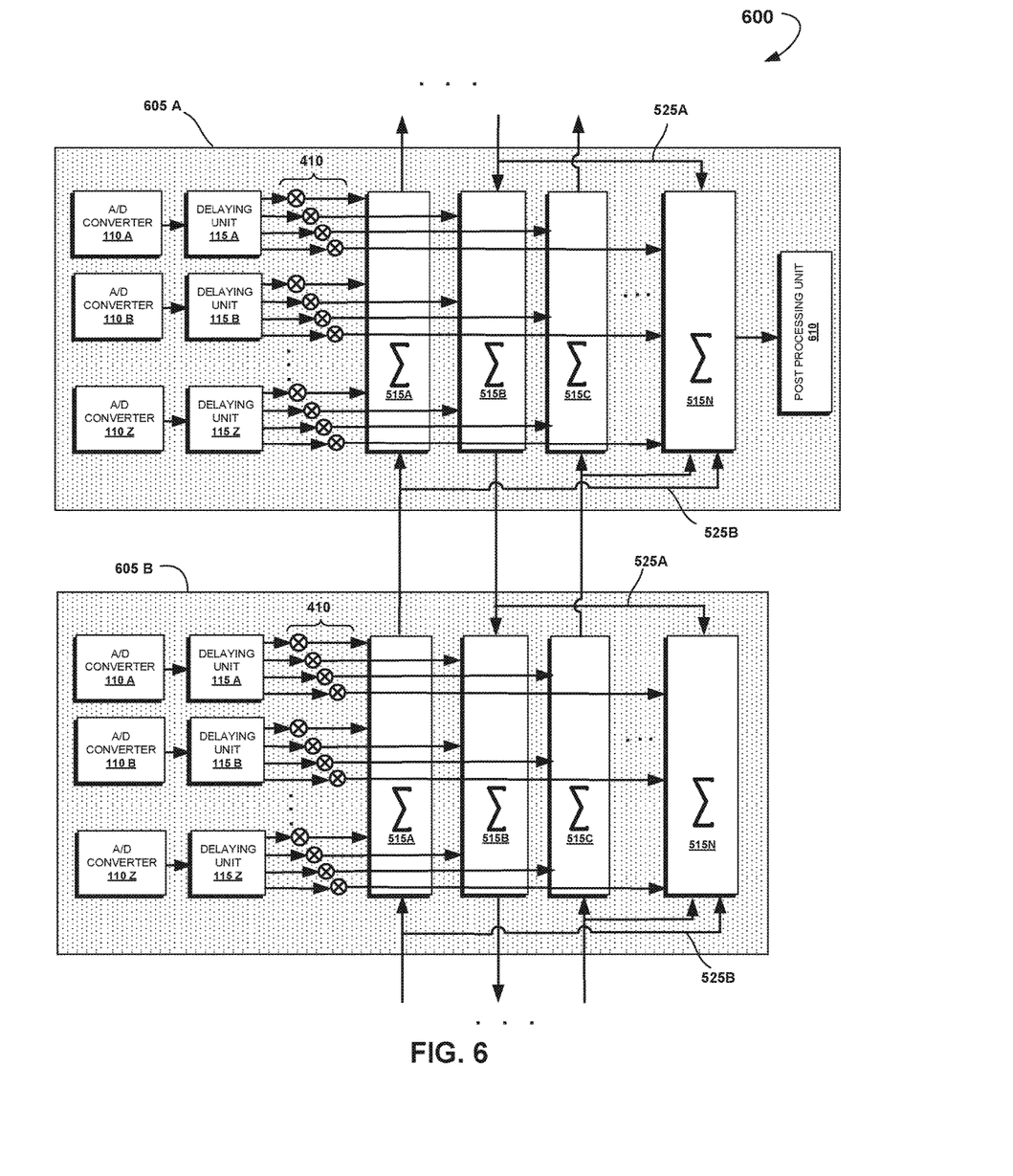
FIG. 6 shows a block diagram of a beamforming system, according to an example embodiment.

FIG. 6 shows a block diagram of a beamforming system 600, according to yet another example embodiment. In general, this embodiment is similar to the one described with reference to FIG. 5 above with the difference being that there is only one modular beamformer which may include a post-processing unit 610. In particular, in the embodiment illustrated in FIG. 6, only modular beamformer 605A includes the post-processing unit 610, and thus the resulting signal is output from this modular beamformer 605A only. It should be recognized by those skilled in the art that there can be more than one post-processing unit 420 in modular beamformer 605A, which may be in communication with corresponding summers 515A-515N.

It should be understood by those skilled in the art that modules of beamforming systems 400, 500 and 600 as described above with reference to FIGS. 4, 5 and 6 may include hardware components, software (firmware) components, or a combination thereof. In certain embodiments, one or more components may be integrated into or implemented as a single device such as a chip or microcontroller. For example, the delaying units, multipliers, and summers may be implemented by one or more processors or similar computing means.

Figure 7:
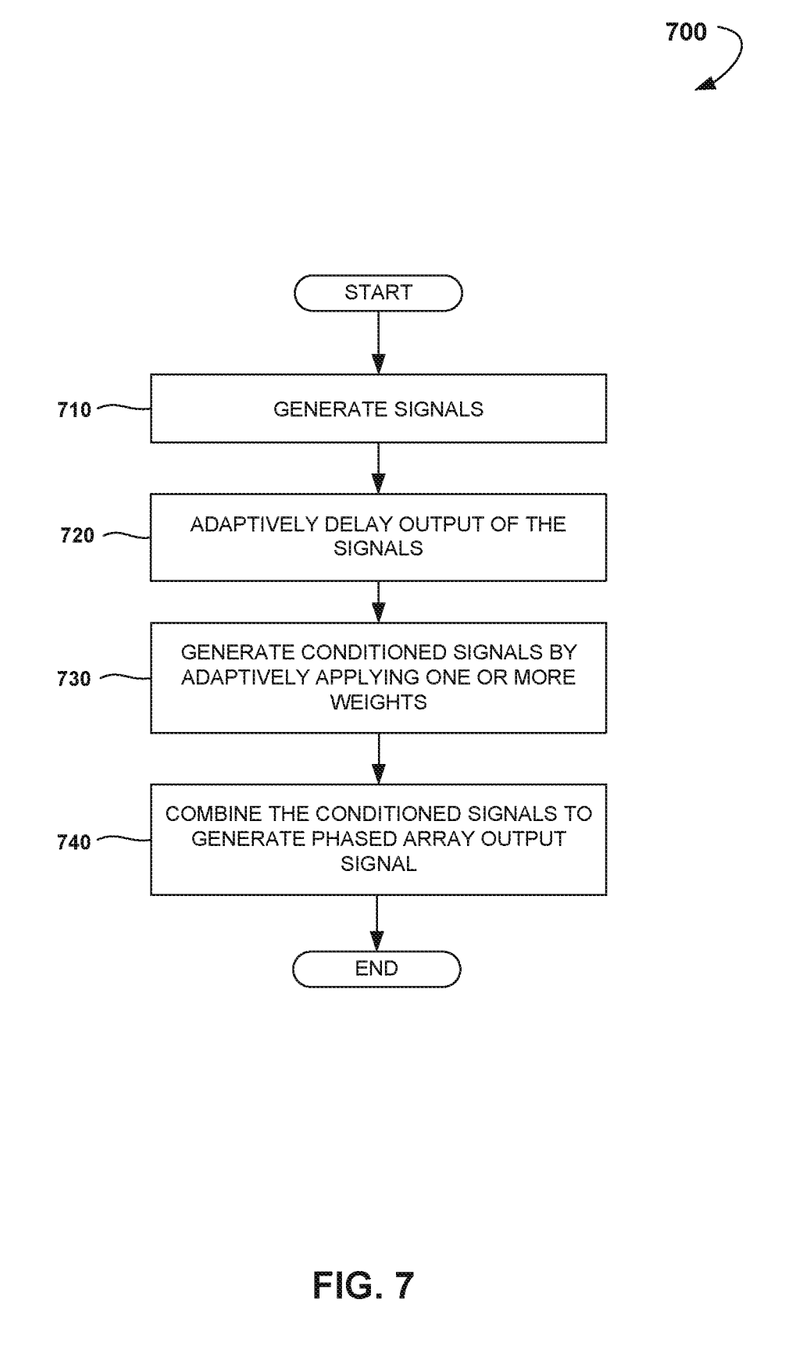
FIG. 7 shows a flow diagram illustrating a method for signal beamforming, according to an example embodiment.

FIG. 7 shows an exemplary flow diagram illustrating a method 700 for signal beamforming, according to one or more embodiments of the present disclosure. The method 700 may be implemented by beamforming systems as described herein with reference to FIG. 4, 5 or 6.

The method 700 may commence in operation 710 with a plurality of signal generation units, such as sensors 105A-105Z and/or A/D converters 110A-110Z, generating digital signals. In an example embodiment, the digital signals may include ultrasound waves.

In operation 720, a plurality of delaying units 115A-115Z may adaptively delay the digital signals generated by the signal generation units.

In operation 730, a plurality of multipliers 410 may generate conditioned digital signals by adaptively applying one or more weights to the digital signals output by the plurality of delaying units 115A-115Z.

In operation 740, a plurality of summers (e.g., summers 415A-415C) may selectively combine the conditioned digital signals output by the plurality of multipliers 410 to generate a phased array output signal.

In one or more embodiments of the present disclosure, all or some of the operations of FIG. 7 may be performed by a computing device, logic, controller, or processor. It should be understood that the processes of FIG. 7 are illustrated as logical flow diagrams, in which each operation represents a sequence of operations that can be implemented in hardware, software, or a combination thereof. In the context of software, the operations can represent computer-executable instructions stored on one or more non-transitory computer-readable storage media that, when executed by one or more processors, perform the recited operations. Generally, computer-executable instructions can include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Thus, the methods and systems for signal beamforming have been described. Although the embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A beamforming system, comprising:
a plurality of modular beamformers operatively coupled to each other, each modular beamformer comprising:
a plurality of signal generation units, each being configured to generate a respective signal;
a plurality of respective delaying units, each corresponding to a respective signal generation unit, each delaying unit being configured to receive a respective signal from the respective signal generating unit, each delaying unit being configured to adaptively delay the respective signal and each delaying unit being configured to output a respective delayed signal;
a plurality of multipliers assigned to each of the delaying units, each multiplier being configured to receive the respective delayed signal output from the respective delaying unit, each multiplier being configured to generate a respective conditioned signal by adaptively applying a respective weight to the respective received delayed signal from the respective delaying unit and each multiplier being configured to output the respective conditioned signal; and
a plurality of summers, each configured to receive a respective group of conditioned signals from a respective group of the plurality of multipliers, being configured to combine the respective group of conditioned signals and being configured to generate a respective phased array output signal, each of the plurality of summers being configured to receive at least another input other than the respective group of conditioned signals; and
the plurality of modular beamformers being interconnected such that each of the plurality of summers within each beamformer receives, as the at least another input, a respective phased array output signal from a summer of a different one of the plurality of modular beamformers.

2. The beamforming system of claim 1, wherein the modular beamformers are connected to each other in parallel.

3. The beamforming system of claim 1, further comprising a post-processing unit configured to process the phased array output signal generated by at least some of the plurality of summers.

4. The beamforming system of claim 3, wherein the post-processing unit is further configured to generate an evaluation signal.

5. The beamforming system of claim 1, wherein the signal generation units comprise at least one ultrasound sensor.

6. The beamforming system of claim 1, wherein the signal generation units comprise at least one analog-to-digital converter.

7. The beamforming system of claim 1, wherein the plurality of signal generation units are analog devices and are configured to generate analog signals, each modular beamformer further comprising a plurality of analog to digital converters, and each analog to digital converter being interposed between a respective signal generation unit and delaying unit.

8. The beamforming system of claim 7, wherein each of the delaying units, multipliers, and first and summers is a digital device and is configured to operate in digital format.

9. The beamforming system of claim 1, wherein each summer is configured to receive conditioned signals from multipliers such that signals from all generation units proceed to each summer.

10. The beamforming system of claim 1, wherein a number multipliers assigned to each delaying unit is equal to a number of summers within each beamformer.

11. The beamforming system of claim 1, wherein at least some summers within each beamformer provides an array output signal to a summer of a different modular beamformer.

12. A method for signal beamforming, the method comprising:
providing a plurality of modular beamformers operatively coupled to each other, including:
providing a plurality of signal generation units, each being configured to generate a respective signal, providing a plurality of respective delaying units, each being corresponding to a respective signal generation unit, each delaying unit being configured to receive a respective signal from the respective signal generating unit, each delaying unit being configured to adaptively delay the respective signal and each delaying unit being configured to output a respective delayed signal;
providing a plurality of multipliers assigned to each of the delaying units, each multiplier being configured to receive the respective delayed signal output from the respective delaying unit, each multiplier being configured to generate a respective conditioned signal by adaptively applying a respective weight to the respective received delayed signal from the respective delaying unit and each multiplier being configured to output the respective conditioned signal; and
providing a plurality of summers, each configured to receive a respective group of conditioned signals from a respective group of the plurality of multipliers, being configured to combine the respective group of conditioned signals and being configured to generate a respective phased array output signal, each of the plurality of summers being configured to receive at least another input other than the respective group of conditioned signals;
interconnected the plurality of modular beamformers; and
receiving at each of the plurality of summers within each beamformer, as the at least another input, a respective phased array output signal from a summer of a different one of the plurality of modular beamformers.

13. The method for signal beamforming of claim 12, including connecting the modular beamformers to each other in parallel.

14. The method for signal beamforming of claim 12, including providing a post-processing unit configured to process the phased array output signal generated by at least some of the plurality of summers.

15. The method for signal beamforming of claim 12, wherein the step of providing a plurality of signal generation units includes providing at least one ultrasound sensor.

16. The method for signal beamforming of claim 12, wherein the step of providing a plurality of signal generation units includes providing least one analog-to-digital converter.

17. The method for signal beamforming of claim 12, wherein the plurality of signal generation units are analog devices and are configured to generate analog signals, each modular beamformer further comprising a plurality of analog to digital converters, and each analog to digital converter being interposed between a respective signal generation unit and delaying unit.

18. The method for signal beamforming of claim 12, wherein each of the delaying units, multipliers, and first and summers is a digital device and is configured to operate in digital format.

19. The method for signal beamforming of claim 12, wherein a number multipliers assigned to each delaying unit is equal to a number of summers within each beamformer.

20. The method for signal beamforming of claim 12, wherein at least some summers within each beamformer provides an array output signal to a summer of a different modular beamformer.

* * * * *